United States Patent [19]

Ghaderi

[11] Patent Number: 5,172,247
[45] Date of Patent: Dec. 15, 1992

[54] HIGH SPEED DIGITAL ERROR DIFFUSION PROCESS FOR CONTINUOUS TONE IMAGE-TO-BINARY IMAGE CONVERSION

[75] Inventor: Mohsen Ghaderi, Rochester, N.Y.

[73] Assignee: Eastman Kodak Company, Rochester, N.Y.

[21] Appl. No.: 602,563

[22] Filed: Oct. 24, 1990

[51] Int. Cl.$^5$ .............................................. H04N 1/40
[52] U.S. Cl. ................................... 358/456; 358/461; 358/462; 358/463; 358/443; 382/54
[58] Field of Search ............... 358/400, 401, 443, 447, 358/448, 452, 455, 456, 457, 458, 461, 462, 463, 464, 465, 466, 467, 468; 382/54, 27

[56] References Cited

U.S. PATENT DOCUMENTS

| 3,484,547 | 8/1965 | Schaeffer | 178/6 |
|---|---|---|---|
| 4,196,452 | 4/1980 | Warren et al. | 358/283 |
| 4,339,774 | 7/1982 | Temple | 358/283 |
| 4,593,325 | 6/1986 | Kannapell et al. | 358/282 |
| 4,649,436 | 3/1987 | Nakagawa et al. | 358/280 |
| 4,692,811 | 9/1987 | Tsuchiya et al. | 358/464 |
| 4,733,230 | 3/1988 | Kurihara et al. | 340/728 |
| 4,760,460 | 7/1988 | Shimotohno | 358/261 |
| 4,876,610 | 10/1989 | Ohsawa et al. | 358/456 |
| 4,878,125 | 10/1989 | Katayama et al. | 358/443 |
| 4,890,167 | 12/1989 | Nakazato et al. | 358/443 |
| 4,891,710 | 1/1990 | Nakazato et al. | 358/448 |
| 4,891,714 | 1/1990 | Klees | 358/458 |
| 4,908,875 | 3/1990 | Assael et al. | 382/52 |
| 4,910,608 | 3/1990 | Whiteman et al. | 358/433 |
| 4,912,569 | 3/1990 | Petilli | 358/465 |
| 4,918,543 | 4/1990 | Petilli | 358/465 |
| 4,920,501 | 4/1990 | Sullivan et al. | 364/518 |
| 4,924,322 | 5/1990 | Kurosawa et al. | 358/448 |
| 5,008,950 | 4/1991 | Katayama et al. | 358/463 |
| 5,014,333 | 5/1991 | Miller et al. | 382/54 |
| 5,077,615 | 12/1991 | Tsuji | 358/461 |

FOREIGN PATENT DOCUMENTS

0206401 12/1986 European Pat. Off. .
63102563 5/1988 Japan .

Primary Examiner—Edward L. Coles, Sr.
Assistant Examiner—Jerome Grant
Attorney, Agent, or Firm—Edward Dugas

[57] ABSTRACT

The invention is a high speed error diffusion process consisting of repetitive computational cycles in which a binary print value is determined from an error-diffused pixel in a continuous tone image. In each cycle, the computation of the previous pixel error exploits computations made during the previous cycle. Specifically, for a continuous tone image consisting of n-bit pixels, the n least significant bits of the previous pixel error are computed during the previous cycle and its sign bit is determined during the current cycle. The n least significant bits of the previous pixel error are the n least significant bits of the error-diffused pixel of the previous cycle. The sign bit of the previous pixel error is determined during the current cycle from the three most significant bits of the error-diffused pixel value of the previous cycle and from the binary print value of the previous cycle.

23 Claims, 5 Drawing Sheets

HIGH SPEED DIGITAL ERROR DIFFUSION PROCESS FOR CONTINUOUS TONE IMAGE-TO-BINARY IMAGE CONVERSION

BACKGROUND OF THE INVENTION

1. Technical Field

The invention is a high speed digital error diffusion process which increases the speed at which a gray scale image can be converted to a binary or bi-tonal image with error diffusion.

2. Background Art

Many image reproduction devices, such as many types of printers for example, can produce only binary (bi-tonal) images consisting typically of uniform black dots on a white background. In order for such a device to reproduce a gray scale or continuous tone image (in which each pixel can assume any value within a range), the gray scale image must be converted to a binary image, which is then transmitted to the reproduction device. In the simplest conventional approach for accomplishing this, each gray scale pixel is compared with a print decision threshold to determine whether or not to print a black dot for the corresponding binary image pixel. If the gray scale pixel value exceeds the threshold, a black dot is printed in the corresponding location in the binary image. A more sophisticated approach is digital half-toning, in which the gray scale pixels are converted to arrays of dispersed uniform-sized dots in accordance with the respective gray scale values.

Binarization of the gray scale image introduces objectionable noise into the binarized image. Various techniques for reducing such noise are discussed in U.S. Pat. No. 4,339,774 to Temple. One such technique is ordered dither, which varies the print decision threshold against which the gray scale value of each pixel in the gray scale image is compared. Such dithering of the threshold is performed in accordance with a repetitive spatial pattern so as to mask the binarization noise. Another technique is error diffusion, in which the error between the gray scale pixel value and the print value of the corresponding binary image pixel is distributed among neighboring pixels. This is done by adding a fraction of the error to each neighboring pixel in the gray scale image to generate a "diffused" gray scale pixel value. The diffused pixel value is then compared with the threshold to determine the binary pixel value. Various combinations of some or all of the foregoing techniques may be made. For example, ordered dither and error diffusion may be employed with or without halftoning in an image binarization process. The present invention is related to improving the error diffusion process.

Figure 1A:
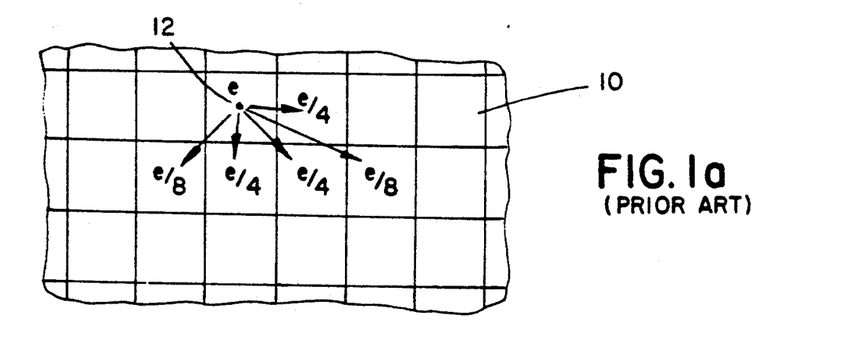
FIGS. 1a and 1b are diagrams illustrating one exemplary implementation of the well-known error diffusion process.
Figure 1B:
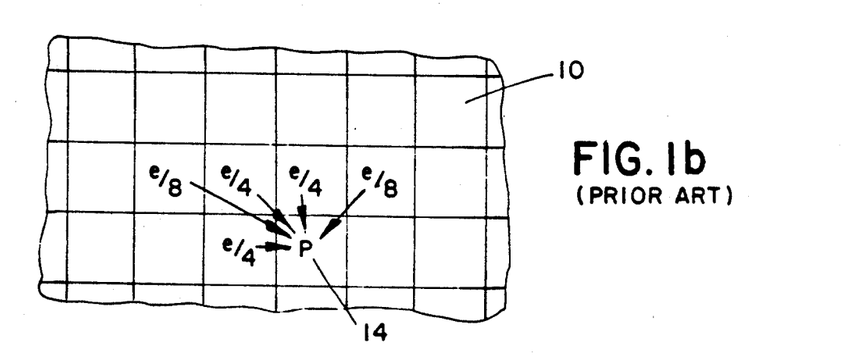

The error diffusion process is illustrated in FIG. 1a. In an array 10 of image pixels, the difference between the gray scale pixel value of a given image pixel 12 and the corresponding pixel value in the binary image is the error e. In a binarization process which proceeds through the array 10 row-by-row and left to right pixel-by-pixel, the error e is distributed (diffused) among the nearest neighboring pixels which have yet to be processed. As indicated in FIG. 1a, the three nearest neighboring pixels are altered by adding e/4 to their respective gray scale values while the remaining two neighboring pixels are altered by adding e/8 to their respective gray scale values before they are compared with a print decision threshold. Since this must be done for all pixels in the image array 10, it follows that the diffused pixel value for a given pixel P is computed as shown in FIG. 1b. The new or diffused gray scale pixel value of the pixel P in FIG. 1b is computed by adding $\frac{1}{4}$ of the errors from each of the three nearest neighbor pixels and $\frac{1}{8}$ of the errors from the remaining two neighbor pixels to the original gray scale value of P. The diffused pixel value is called $P_{dif}$.

Figure 2A:
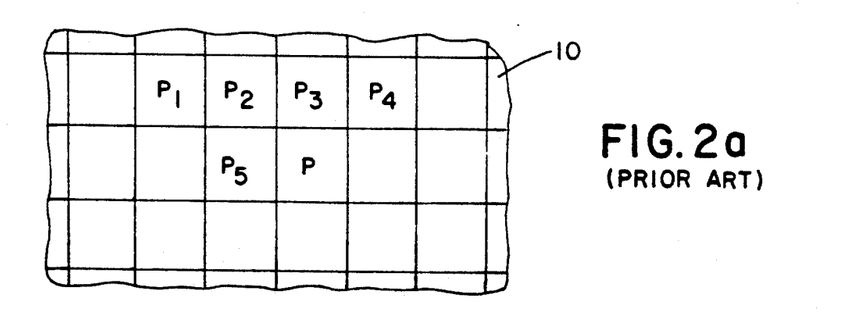
FIGS. 2a and 2b are diagrams illustrating the locations of neighboring pixels and their corresponding errors in accordance with the diagrams of FIGS. 1a and 1b.
Figure 2B:
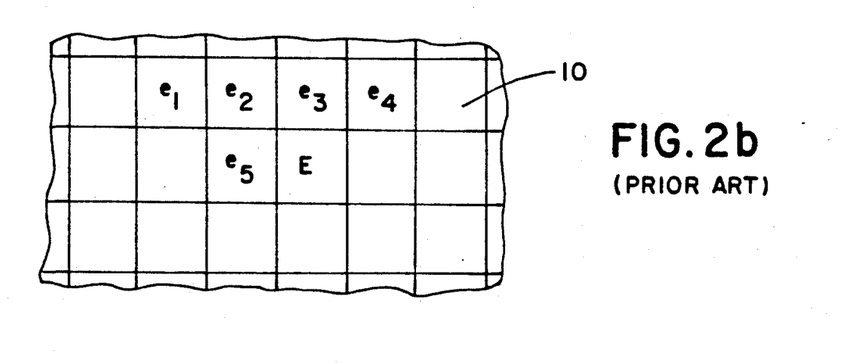

The foregoing error diffusion process may be defined by reference to FIGS. 2a and 2b. FIG. 2a illustrates the pixel P and its five nearest neighbors $P_1$, $P_2$, $P_3$, $P_4$, $P_5$ which were processed before P in preceding cycles of the error diffusion process. FIG. 2b illustrates the corresponding errors $e_1$, $e_2$, $e_3$, $e_4$, $e_5$ and E for these same pixels. The diffused error at the current pixel P is defined as:

$$ED = (\tfrac{1}{4})e_1 + (\tfrac{1}{8})e_2 + (\tfrac{1}{4})e_3 + (\tfrac{1}{8})e_4 + (\tfrac{1}{4})e_5 \qquad (1)$$

in which the sum of the coefficients is unity.

The diffused pixel value at the current pixel P is defined as:

$$P_{dif} = P + ED. \qquad (2)$$

The print value (either black or white) selected for the current pixel P will be referred to as PV. If a black dot is printed, then PV is the maximum n-bit value. Otherwise, PV is zero. The error E at the current pixel is computed as follows:

$$E = P_{dif} - PV. \qquad (3)$$

The dither threshold (or print decision threshold) will be referred to as D. The print value PV for the current pixel is the maximum n-bit number (black) if $P_{dif} \geq D$ and is zero (white) otherwise. In two's complement arithmetic the most significant bit of a word is its sign bit, and PV may be defined as follows:

$$PV = [M.S.B. \text{ of } (P_{dif} - D)]^{-1} \times [\text{maximum n-bit value}], \qquad (4)$$

where M.S.B denotes most significant bit—the sign bit—and the superscript $-1$ denotes an inversion of the bit.

Equations (1) through (4) constitute one cycle of the error diffusion process. The current pixel error E of equation (3) becomes the previous pixel error $e_5$ of the next cycle.

One variation of the foregoing process disclosed in U.S. Pat. No. 4,891,710 to Nakazato is to quantize the error E by dropping the n least significant bits of E in the current cycle, and to apportion these bits among the errors of other pixels in subsequent cycles.

The foregoing computations are time-consuming and must be performed once in each cycle of the error diffusion process. In particular, the computations of a given cycle cannot begin until the previous pixel error $e_5$ has been computed. The computation of the previous pixel error $e_5$ cannot begin until the previous print value is determined upon the completion of the previous cycle. Thus, the error diffusion process cycle cannot proceed any faster than the time required to compute the previous pixel error $e_5$.

Therefore, there is a need for a way of reducing the amount of time required to perform the calculations of equations (1) through (4) in each cycle of the error diffusion process. It has not seemed possible to reduce the time required to perform these calculations, since none of the steps can be omitted without loosing the desired effects of error diffusion. Moreover, the time required to perform the calculations in a given integrated circuit technology is a fixed quantity.

Accordingly, it is the principal object of the invention to reduce the amount of time required to perform each cycle of the error diffusion process by modifying the error diffusion computations without affecting the error diffusion process or losing any of its effects or benefits.

It is a related object of the invention to take advantage of the iterative nature of the calculations of the error diffusion process by using the results of some of the calculations in one cycle as the interim results of related calculations in the next cycle, whereby no time is spent computing the interim results in the next cycle. More specifically, it is an object of the invention to begin a portion of the computation of the previous pixel error $e_5$ of the current cycle before the end of the previous cycle and complete the rest of the computation during the current cycle.

It is another related object of the invention is to take advantage of the following precepts of the invention which apply to all but the least significant bit of the diffused pixel value $P_{dif}$: (A) in two's complement arithmetic, the n least significant bits (LSB's) of the diffused pixel value $P_{dif}$ computed in the step of equation (2) are the same as the n LSB's of the previous pixel error $e_5$ computed in the later step of equation (3); and, (B) only the sign bit or MSB of the previous pixel error $e_5$ cannot be determined from the diffused pixel value $P_{dif}$.

It is a further related object of the invention to use a portion of the diffused pixel value $P_{dif}$ computed in a previous cycle as the two's complement absolute value—the n least significant bits or LSB's—of the previous pixel error $e_5$ of the current cycle, thus obviating the need to calculate these bits during the next cycle.

It is a still further object of the invention to use the most significant bits (MSB's) of $P_{dif}$ of the previous cycle to immediately determine the sign bit or MSB of the previous pixel error $e_5$ of the current cycle.

DISCLOSURE OF THE INVENTION

The invention is a high speed error diffusion process consisting of repetitive computational cycles in which the computation of the previous pixel error $e_5$ exploits computations made during the previous cycle. Specifically, for a gray scale image consisting of n-bit pixels, the n least significant bits of the previous pixel error $e_5$ are computed during the previous cycle and the remaining bits of $e_5$ are computed during the current cycle. The n least significant bits of the diffused pixel value $P_{dif}$ of the previous cycle are used in the current cycle as the n least significant bits of the previous pixel error $e_5$. The most significant bits (including the sign bit) of the previous pixel error $e_5$ are determined from the most significant bits of $P_{dif}$ of the previous cycle in accordance with a look-up table.

The computation of the previous pixel error is the pacing factor in each error diffusion process cycle of equations (1) through (4) above. The advantage of the invention is that this computation is given a "head start" by performing a portion of it during the previous cycle. Another advantage of the invention is that the remaining portion of the computation, namely the determination of the most significant bit of $e_5$, is obtained immediately by applying the most significant bits of $P_{dif}$ of the previous cycle together with the binary print decision bit (1 for black or 0 for white) for the previous pixel to a look up table. As a result, very little time is required during the current cycle to compute the previous pixel error $e_5$. Since this task is the pacing factor in each cycle of the error diffusion process, the error diffusion process may be performed at a much faster rate with the invention.

The invention is preferably implemented in digital logic circuitry using two's complement arithmetic. Moreover, for n-bit gray scale input images, the binary print values of the output image are preferably associated with gray scale pixel values of the maximum n-bit number (for black) and zero (for white). In computing the previous pixel error in accordance with equation (3) above, the invention employs two's complement addition to perform the subtraction operation of equation (3).

The invention recognizes that adding the two's complement of the print value PV to the diffused pixel value $P_{dif}$ does not change the n LSB's of $P_{dif}$, ignoring the least significant bit at least temporarily. This is because for an 8-bit image for example, PV is either 00000000 (white) or 11111111 (black), so that its two's complement is either 00000000 or 100000001 (where the most significant or ninth bit in the latter is a negative sign bit). Adding either one of these two's complements of PV to a byte comprising the n LSB's of $P_{dif}$ can affect only the sign bit of that byte (ignoring the least significant bit). The invention further recognizes that for an n-bit input image, the previous pixel error cannot exceed n bits. Accordingly, the n LSB's of $P_{dif}$ of the previous cycle comprise all but the sign bit (MSB) of the previous pixel error $e_5$ of the current cycle, to within a possible error of 1 in the least significant bit.

The invention further recognizes that the sign bit of the previous pixel error $e_5$ can be inferred immediately from the most significant bits of the diffused pixel value $P_{dif}$ of the previous cycle and the binary print decision of the previous pixel. This is because the most significant bits of the diffused pixel value $P_{dif}$ together with the binary print decision constitute all of the information required to determine whether $P_{dif}$ is less than or greater than PV.

BRIEF DESCRIPTION OF THE DRAWINGS

The invention is described below in detail by reference to the accompanying drawings, of which.

MODES FOR CARRYING OUT THE INVENTION

Figure 3:
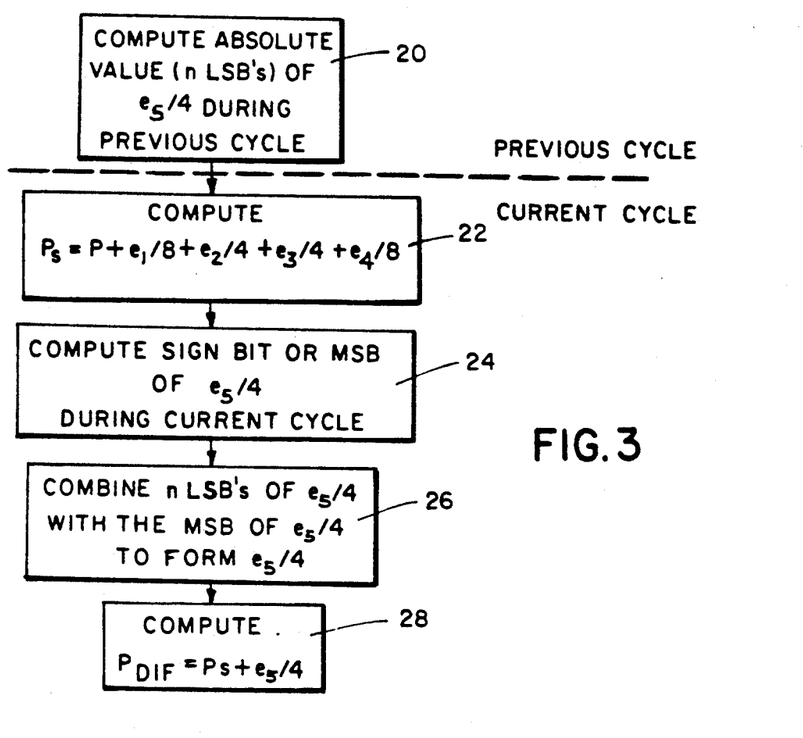
FIG. 3 is a simplified block diagram of a portion of the high speed error diffusion process of the present invention.

The error diffusion process cycle of equations (1) through (4) illustrated in FIG. 1b is improved by performing part of it during the previous cycle. Specifically, the computation of all but the sign bit of the previous pixel error $e_5$ is performed during the previous cycle. Then, the sign bit of $e_5$ is determined during the current cycle. Referring to the flow diagram of FIG. 3, the computation of the previous pixel error commences during the previous cycle in block 20 with the computation of the absolute value (i.e., all bits except for the sign bit) of the previous pixel error $e_5$. Then, during the current cycle, the diffused pixel value $P_{dif}$ is partially computed in block 22 by computing the sum $P_s$ of the current pixel P and the recent pixel errors except the most recent or previous pixel error $e_5$. Next, the sign bit of the previous pixel error $e_5$ is determined in block 24. Then, the bits representing the absolute value of $e_5$ computed in block 20 are combined with the sign bit to produce the previous pixel error $e_5$ in block 26. Finally, the computation of the diffused pixel value $P_{dif}$ is completed in block 28 by adding $e_5/4$ to $P_s$. At this point the error diffusion process is ready to perform the step of equation (3) above.

Figure 4:
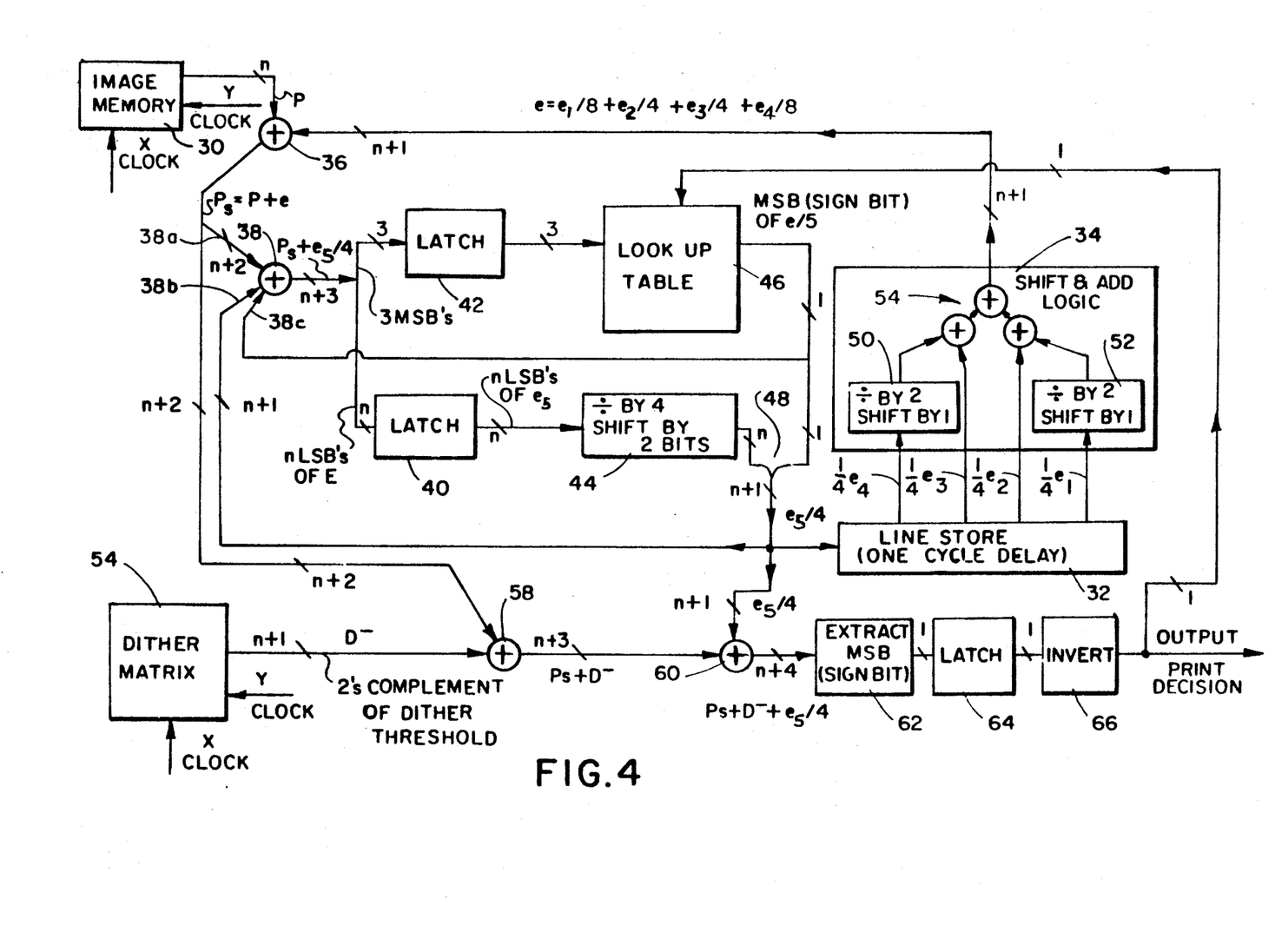
FIG. 4 is a block diagram of a digital circuit embodying the present invention.

Referring now to FIG. 4, a digital circuit embodying the invention receives the current gray scale n-bit pixel value P from a memory 30 storing the two-dimensional gray scale image in synchronism with an X clock signal and a Y clock signal. In the embodiment of FIG. 4, all numbers are represented in accordance with conventional practice by at least n bits followed by a sign bit, whenever appropriate, as the most significant bit. Each arithmetic operation in this embodiment is either an addition or a division. Division by multiples of two is performed by shifting the bits of the dividend number by the appropriate number of places. Each addition operation is implemented by a conventional adder circuit having two addend inputs and one sum output. The data paths between operations are conventionally labelled in FIG. 4 with the number of conductors or bits in the path, including the sign bit. It is understood that wherever FIG. 4 shows an adder whose two addend inputs have a different number of conductors or bits, the addend input having the smaller number of bits is "sign bit-extended" in accordance with well-known practice. For example, the adder 60 of FIG. 4 to be described below receives an n+1 bit number and an n+3 bit number, although both inputs to the adder 60 have n+3 bits. The sign bit of the smaller n+1 bit number, i.e., its n+1 bit, is "extended" by wiring it to the most significant bits of its adder input, namely the n+1, n+2 and n+3 bits, in accordance with conventional practice.

Computation of the Previous Pixel Error $e_5$

The previous pixel errors $e_1/4$, $e_2/4$, $e_3/4$, $e_4/4$ are held in a line store 32. A shift and add logic circuit 34 connected to the line store 32 forms the partial error sum:

$$e_5 = e_1/8 + e_2/4 + e_3/4 + e_4/8. \qquad (5)$$

The line store 32 preferably functions in the manner of a first in-first out (FIFO) register in which successive values of $e_5/4$ from previous cycles of the error diffusion process are held in respective cells of the line store, the shift and add logic circuit 34 addressing the cells in parallel. Divide-by-two circuits 50, 52 divide the first and last errors $e_1/4$ and $e_4/4$ by two (by performing a single bit shift), and adder circuits indicated generally at 54 sum the outputs of the divide-by-two circuits 50, 52 with the intermediate errors $e_2/4$ and $e_3/4$ to produce the partial diffused error $e_5$ of equation 5.

An adder 36 adds $e_5$ and P to form the partial diffused pixel value:

$$P_s = P + e_5 \qquad (6)$$

An adder 38 adds the partial diffused pixel value $P_s$ to the previous pixel error $e_5/4$ to produce the complete diffused pixel value $$P_{dif} = P_s + e_5/4 \qquad (7)$$

at its output. If the current cycle is the first cycle, the previous pixel error $e_5/4$ is zero and the output of the adder 38 is the same as the output of the adder 36. The n least significant bits (LSB's) of the output $P_{dif}$ of the adder 38 constitute all but the sign bit of the current pixel error E, as will be explained below herein. These n LSB's are stored in a latch 40 to be output during the next cycle as the n LSB's of the previous pixel error $e_5$. A wired shift circuit 44 connected to the output of the latch 40 shifts the n LSB's of $e_5$ by two bits to perform a division by 4, producing the n LSB's of $e_5/4$.

Why The n LSB's Of $P_{dif}$ And E Are The Same

According to Equation (3), the current pixel error E (which becomes the previous pixel error $e_5$ of the next cycle) is computed by subtracting PV from $P_{dif}$. If the number n of bits per pixel is 8, then PV is either 11111111 (black) or 00000000 (white). In two's complement arithmetic, E is computed by adding the two's complement of PV to $P_{dif}$. The two's complement of PV is either 100000001 (black) or 00000000 (white). The least significant bit of PV may be dropped to zero without introducing more than a negligible error. In this approximation, one of the following is added to $P_{dif}$ to compute E: 100000000 (black) or 00000000 (white), so that the n LSB's of $P_{dif}$ are unchanged—added to 0—in this computation regardless of the print decision. Thus, in this approximation, the n LSB's of E and $P_{dif}$ are identical.

(In the preferred embodiment of the invention, this approximation is avoided so that E and $P_{dif}$ are exactly equal to one another, even in the least significant bit. This exact result is reached in the adder 38 by adding the sign bit of E—whose determination is described below—to the least significant bit of $P_{dif}$ in the next cycle. How this addition is implemented will be described below.)

E can never have more than n bits (not including its sign bit) if each input gray scale image pixel P, the print value PV and the print decision threshold D are all n-bit numbers. As a result, the n LSB's of $P_{dif}$ comprise all but the sign bit of E. That E can never have more than n bits (not including its sign bit) will now be demonstrated from equations (1) through (4).

Why the Pixel Error E Comprises No More Than n Bits

During the second cycle of the error diffusion process, P is the second pixel in the input image to be processed, so that there is only one previous pixel. In this case, if n = 8:

$$0 \leq P \leq 255, \text{ and} \qquad (8)$$

$$-255 < ED < 255. \qquad (9)$$

Now, since typically $$0 < D < 255, \qquad (10)$$

and either $$PV = 255 \text{ if } P_{dif} > D \qquad (11)$$

or $$PV = 0 \text{ if } P_{dif} \leq D, \qquad (12)$$

then from equation (3) above $$-255 < E < 255. \qquad (13)$$

Since E of one cycle becomes $e_5$ during the next cycle, this means that during the third cycle of the error diffusion process of the present example:

$$-255 < e_5 < 255. \qquad (14)$$

During all cycles, the range of ED of equation (1) above cannot exceed the range of E because the sum of the coefficients in equation (1) defining ED is unity. Therefore, equation (9) applies throughout all cycles of the error diffusion process, which means that equations (9) through (14) apply throughout all cycles as well.

From equation (14), it follows that $e_5$ comprises no more than 8 least significant bits followed by a most significant sign bit for images of 8-bit pixels. For images of n-bit pixels, $e_5$ comprises no more than n least significant bits followed by a most significant sign bit.

Determination of the Sign of the Previous Pixel Error

The remaining bits of $P_{dif}$, namely its 3 most significant bits including its sign bit, are held in a latch 42 having a one cycle delay. The output of the latch 42 constitutes the 3 MSB's of $P_{dif}$ of the previous cycle and are applied to the input of a look-up table 46. The look-up table 46 determines from all of its inputs the sign bit or MSB of $e_5$, and transmits this sign bit at its output. The sign bit is appended to the n LSB's of $e_5$ at the node 48 to form the n+1 bit word of the previous pixel error $e_5/4$. The previous pixel error $e_5/4$ is transmitted to one input of the adder 38, enabling the adder 38 to perform the computation of equation (6) above.

As mentioned previously in connection with the adder 38, in the preferred embodiment of the invention the correlation between the n LSB's of $P_{dif}$ produced by the adder 38 and the n LSB's of the current pixel error E is made to be identical even to the least significant bit by adding the sign bit of $e_5$ to the least significant bit of $P_{dif}$. This is accomplished by implementing the adder 38 as a standard adder circuit of the type well-known in the art having a carry bit input 38a which enables a received carry bit to be added to the least significant bit of the adder input 38b corresponding to $e_5$. The sign bit of $e_5$ from the look-up table 46 is applied to the carry bit adder input 38b.

The previous pixel error $e_5/4$ is also sent from the node 48 to the line store 32, where it is held along with the preceding pixel errors to become, during subsequent cycles, $e_4/4$, $e_3/4$, $e_2/4$ and then $e_1/4$, respectively, before being discarded by the line store 32.

Determination of the Binary Print Decision

The two's complement $D^-$ of the print threshold D is obtained from an ordered dither matrix 54 addressed by the X clock and Y clock signals. The partial diffused pixel value $P_s$ computed by the adder 36 is transmitted to the input of another adder 58 whose other input receives the two's complement threshold $D^-$. The adder 58 computes the quantity $P_s + D^-$. An adder 60 receives the previous pixel error $e_5/4$ from the node 48 and the quantity $P_s + D^-$ from the adder 58 and computes the sum $$P_s + D^- + e_5/4, \qquad (15)$$

which in accordance with equation (7) is equal to the algebraic sum $$P_{dif} + D^-. \qquad (16)$$

The sign of the sum (16) determines the print decision as follows. A circuit 62 extracts the MSB or sign bit of the sum (16) from the output of the adder 60. A latch 64 having a one cycle delay relays this sign bit to an inverter 66 which inverts the sign bit, and the result is output as the binary print decision bit. It is also one of the inputs to the look-up table 46 which determines the sign bit of $e_5$.

How the Look-up Table 46 Determines the Sign Bit of the Previous Pixel Error $e_5$ The look-up table 46 of FIG. 4 provides an immediate determination of the sign bit of the previous pixel error $e_5$. As indicated in FIG. 4, the only inputs to the look-up table 46 are the three MSB's of $P_{dif}$ of the previous cycle (from the latch 42) and the print decision output bit of the previous cycle (from the inverter 66). The table of FIG. 5 shows how the look-up table 46 determines the sign bit of $e_5$ of the current cycle from these inputs.

Figure 5:
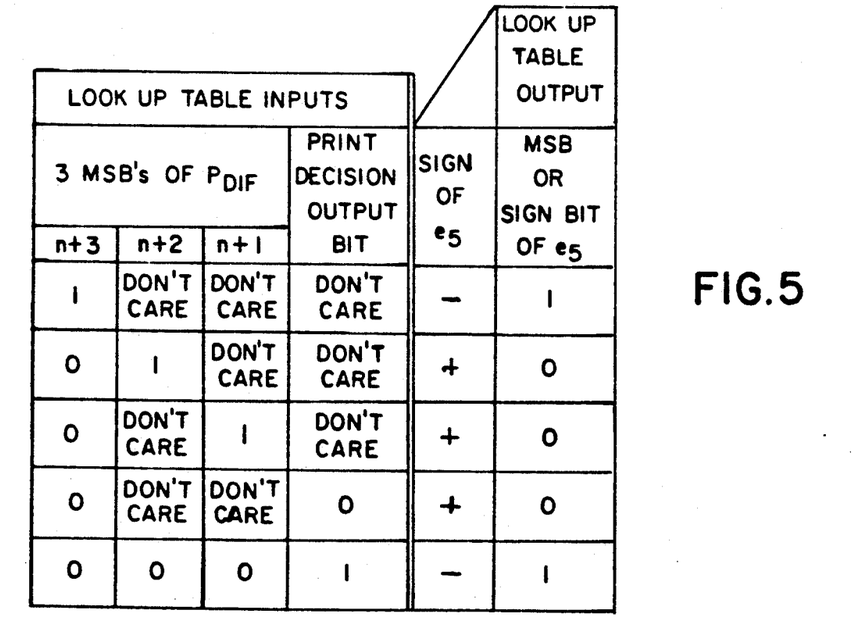
FIG. 5 is a table illustrating the contents of a look-up table employed in the circuit of FIG. 5 for determining the sign bit of the previous pixel error.

The first row of the table of FIG. 5 indicates that the sign bit of $e_5$ is 1 (negative) if the most significant bit or sign bit (bit n+3) of $P_{dif}$ is 1 (negative), regardless of the other inputs to the look-up table 46. This is because PV is either a positive number or zero subtracted from $P_{dif}$ in equation (3). Since the sign of $P_{dif}$ is negative in this case, the result of equation (3) must necessarily be negative.

The second row of the table of FIG. 5 indicates the sign bit of $e_5$ is 0 (positive) if the n+3 and n+2 bits of $P_{dif}$ are 0 and 1, respectively, regardless of the other inputs to the look-up table 46. This is because in this case $P_{dif}$ is a large positive number greater than the largest n-bit number. Since PV is no greater than n bits, the result of equation (3) must necessarily be positive in this case.

The third row of the table of FIG. 5 indicates that the sign bit is 0 (positive) if the n+3 and n+1 bits of $P_{dif}$ are 0 and 1, respectively, regardless of the other inputs to the look-up table 46. This is because in this case $P_{dif}$ is a positive number greater than the largest n-bit number. Since PV is no greater than n bits, the result of equation (3) must necessarily be positive in this case.

The fourth row of the table of FIG. 5 indicates that the sign bit is 0 (positive) if the n+3 (sign) bit of $P_{dif}$ is 0 (positive) and the print decision output bit is 0 (white), regardless of the other inputs to the look-up table 46. This is because in this case the sign bit of $P_{dif}$ indicates that it is at least a small positive number, while the "white" print decision means that the corresponding print value PV was 0, so that sign of the result of equation (3) must necessarily be positive.

The last row of the table of FIG. 5 indicates that the sign bit is 1 (negative) if all three MSB's of $P_{dif}$ are 0 and the print decision output bit is 1 (black). In this case, the three MSB's of $P_{dif}$ indicate that $P_{dif}$ is a positive number no greater than the maximum n-bit number, while the "black" print decision indicates that the corresponding print value was the maximum n-bit number. In this case, the result of equation (3) is negative. Of interest here is the special case in which both $P_{dif}$ and PV are the maximum n-bit number, so that the result of equation (3) is zero and its sign is of no significance. For this special case, in the preferred embodiment (in which the sign bit of $e_5$ is applied to the carry bit input 38a of the adder 38), the two's complement arithmetic result of equation (3) comprises all zero bits—which is the exact result—followed by a sign bit of 1.

Figure 6A:
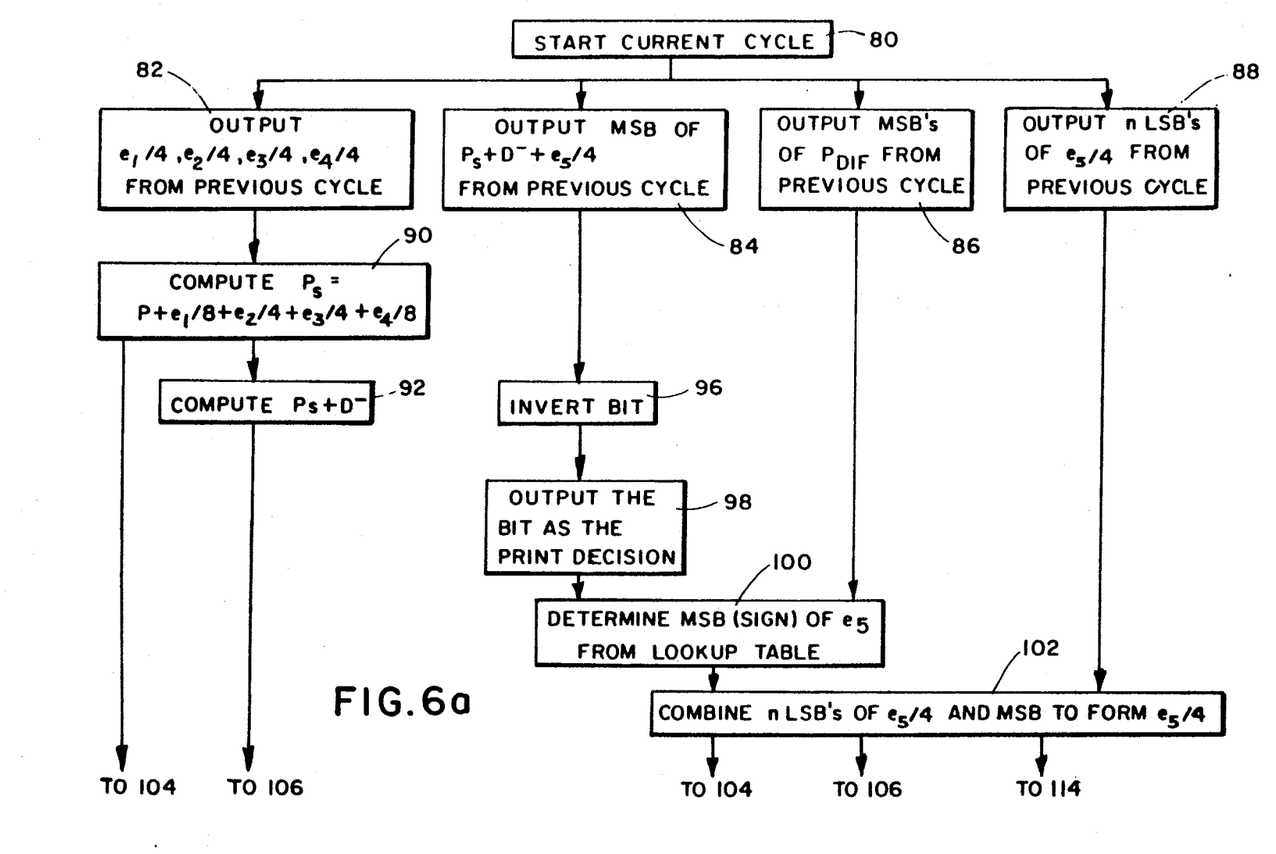
FIG. 6a and 6b together constitute a flow diagram illustrating a typical cycle of the error diffusion process of the invention performed by the circuit of FIG. 4.
Figure 6B:
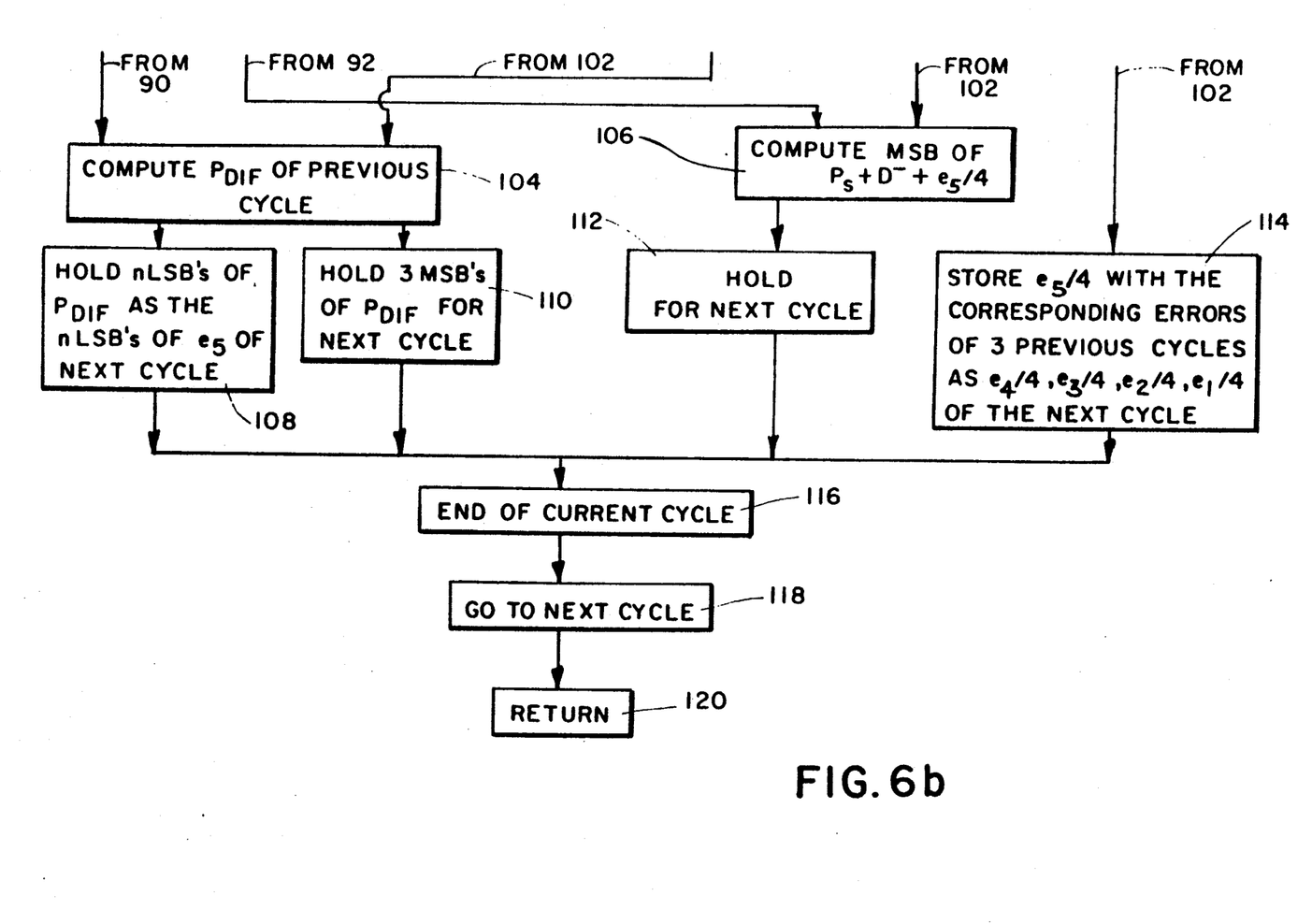

FIGS. 6a and 6b illustrate the process of the invention performed by the high speed circuit of FIG. 4. Once the current cycle is started (block 80 of FIG. 6), the following events occur simultaneously: (a) the line store 32 outputs four of the previous five pixel errors (block 82 of FIG. 6a); (b) the latch 64 outputs the MSB of the sum $P_s + D^- + e_5/4$ held over from the previous cycle (block 84 of FIG. 6a); (c) the latch 42 outputs the three MSB's of $P_{dif}$ held over from the previous cycle (block 86 of FIG. 6a); and (d) the latch 40 outputs the n LSB's of E held over from the previous cycle, comprising the n LSB's of $e_5$ of the current cycle, which the shift circuit 44 converts to $e_5/4$ (block 88 of FIG. 6a).

Next, the adder 36 computes $P_s$ (block 90 of FIG. 6a) from which the adder 58 computes the sum $P_s + D^-$ (block 92). The inverter 66 inverts the MSB or sign bit from the latch 64 (block 96) and the inverted bit is output as a print decision output bit (block 98). Then, the lookup table 46 uses the print decision output bit together with the three MSB's of $P_{dif}$ of the previous cycle from the step of block 86 to determine the sign bit of $e_5$ (block 100). This sign bit is then combined at the node 48 with the n LSB's of $e_5/4$ from the step of block 88 to produce $e_5/4$ (block 102).

The previous pixel error $e_5/4$ produced in the step of block 102 is then used in independent steps in blocks 104 and 106 in FIG. 6b. In the step of block 104, the results from the steps of blocks 90 and 102 are added to compute the value of $P_{dif}$. In the step of block 106, the results of the steps of blocks 102 and 92 are added to compute the quantity $P_s + D^- + e_5/4$, and the MSB of this quantity is extracted.

The foregoing results are then held over for the next cycle in various locations in the circuit of FIG. 4 in the steps of blocks 108, 110, 112 and 114 of FIG. 6b. Specifically, in the step of block 108 the n LSB's of $P_{dif}$ computed in the step of block 104 are treated as the n LSB's of the current pixel error E and held over for the next cycle in the latch 40. In the step of block 110, the three MSB's of $P_{dif}$ from the step of block 104 are held over for the next cycle in the latch 42. In the step of block 112, the MSB determined in the step of block 106 is held over for the next cycle in the latch 64. Finally, in the step of block 114, the previous pixel error $e_5/4$ is input to the line store 32 for accumulation with the previous pixel errors of earlier cycles.

The current cycle is then concluded (block 116) and the system changes over to the next cycle (block 118) by returning to the beginning of the process of FIGS. 6a and 6b (block 120).

Various embodiments of the invention may be constructed. For example, while the invention has been described in connection with an error diffusion process which uses the five previous pixel errors including four from the previous pixel row, the invention may also be used in an error diffusion process which uses more or less than the five previous pixel errors from a plurality of previous pixel rows without affecting the essential operation of the invention. While the invention has been described in connection with an error diffusion process in which the coefficients of the previous pixel errors to be fed forward to subsequent pixels are multiples of $\frac{1}{4}$, any other set of coefficients may be employed, provided their sum does not deviate excessively from unity. In this case, the delay and division-by-four functions performed by the latch 40 and the shift circuit 44 may be replaced by a synchronous look-up table and the shift and add logic 34 may be implemented as a programmed logic array of the type well-known in the art. The print decision threshold D can be held at a constant value or can be taken from the ordered dither matrix 30, as desired.

While the invention has been described in detail by specific reference to preferred embodiments thereof, variations and modifications thereof may be made without departing from the true spirit and scope of the invention.

What is claimed is:

1. An error diffusion process for converting a continuous tone image consisting of an array of n-bit pixels to a binary image consisting of an array of binary print values, said process consisting of plural repetitive computational cycles, said process processing each n-bit pixel in a respective cycle to produce a corresponding diffused pixel value and a corresponding one of said binary print values whereby a current n-bit pixel is processed in a current cycle, each cycle of said process comprising:

computing a partial sum of pixel errors comprising differences between: (a) a set of diffused pixel values computed from n-bit pixels processed in preceding cycles not including the previous one of said cycles and (b) corresponding binary print values of said binary image;

computing a partial pixel value by adding said partial sum to said current n-bit pixel;

determining a sign of a pixel error of the previous cycle from most significant bits of the diffused pixel value computed in said previous cycle and from a binary print value determined in said previous cycle;

producing the pixel error of said previous cycle by appending said sign bit to the n least significant bit of the diffused pixel value computed in the previous cycle;

producing the diffused pixel value of the current cycle by adding said previous pixel error to said partial pixel value; and adding said diffused pixel value of said current cycle to the two's complement of a corresponding print decision threshold to produce a decision sign bit, and determining the binary print value of the current cycle from said decision sign bit.

2. The process of claim 1 wherein said corresponding print decision threshold is comprised in a matrix of ordered dither print decision thresholds.

3. The process of claim 1 further comprising:
storing said diffused pixel value for use during the next cycle; and
storing said pixel error of the previous cycle for use during subsequent cycles, whereby said partial sum of errors is computed from the previous pixel errors stored in preceding cycles.

4. The process of claim 1 wherein said partial sum of errors is comprised in a weighted total sum of errors whose coefficients are normalized to unity, and wherein said step of producing said diffused pixel value is preceded by the step of:
multiplying said pixel error of the previous cycle by a corresponding coefficient of said weighted total sum.

5. The process of claim 2 wherein the most significant bit of said diffused pixel value is a sign bit, and wherein the step of determining the sign bit of the pixel error of the previous cycle comprises one of:
(1) determining a positive sign bit if (a) the most significant bit of the previous cycle's diffused pixel value is positive and either (b) at least one of a second or third most significant bits of the previous cycle's diffused pixel value is one or (c) the previous cycle's binary pixel value is a minimum binary print value; and
(2) determining a negative sign bit if either (a) the sign of the previous cycle's diffused pixel value is negative or (b) the sign bit of the previous cycle's diffused pixel value is positive, the second and third most significant bits of the previous cycle's diffused pixel value are both zero and the previous cycle's binary pixel value is a maximum binary print value.

6. The process of claim 5 wherein said minimum and maximum binary print values are zero and the maximum n-bit number, respectively, whereby the corresponding pixel error equals one of (a) the diffused pixel value if the binary print value is the minimum binary print value and (b) the diffused pixel value plus the two's complement of the maximum n-bit number if the corresponding binary print value is the maximum binary print value.

7. The process of claim 6 wherein the step of producing said diffused pixel value further comprises:
adding said sign bit of said pixel error of the previous cycle to the least significant bit thereof.

8. In an error diffusion process for converting a continuous tone image comprising an array of n-bit pixels to a binary image comprising an array of binary pixels, in which an error comprising a difference between a diffused value of each one of said n-bit pixels and a corresponding one of said binary pixels is distributed in said continuous tone image among neighbor n-bit pixels in a local neighborhood of the one n-bit pixel to produce diffused pixel values for the neighboring n-bit pixels whereby each diffused pixel value comprises an n-bit pixel value and a total sum of the errors corresponding to neighboring pixels, each of said binary pixels being determined from the corresponding diffused pixel value and a corresponding print decision threshold, said process computing successive diffused pixel values for successive ones of said n-bit pixels in successive computational cycles of said process, said total sum of errors including a previous pixel error of one of said neighboring pixels processed in the previous cycle, a method for computing said previous pixel error and said diffused pixel value in each cycle, comprising:
storing the diffused pixel value of each cycle for use during the next cycle;
determining a sign bit of the previous pixel error for the current cycle from: (a) a most significant bit of the diffused pixel value of the previous cycle and (b) the binary pixel corresponding to the previous cycle;
producing the previous pixel error for the current cycle by appending said sign bit to the n least significant bits of the diffused pixel value of the previous cycle; and
producing the diffused pixel value of the current cycle by adding together: (a) said previous pixel error, (b) an n-bit pixel corresponding to said current cycle and (c) a partial sum of the errors of the neighboring pixels corresponding to the current cycle excluding said previous pixel error.

9. The method of claim 8 further comprising:
storing said previous pixel error computed in each cycle for use during subsequent cycles, whereby said partial sum of errors is computed from the previous pixel errors stored in preceding cycles.

10. The method of claim 8 wherein said total sum of errors comprises a weighted sum whose coefficients are normalized to unity, said partial sum corresponding to a portion of said weighted sum, and wherein said step of producing said diffused pixel value is preceded by the step of:
multiplying said previous pixel error by a corresponding coefficient of said weighted sum.

11. The method of claim 8 wherein the most significant bit of said diffused pixel value is a sign bit and wherein the step of determining said sign bit of the previous pixel error comprises one of:
(1) determining a positive sign bit if (a) the most significant bit of the previous cycle's diffused pixel value is positive and either (b) at least one of the second or third most significant bits of the previous cycle's diffused pixel value is one or (c) the previous cycle's binary pixel value is a minimum binary print value; and
(2) determining a negative sign bit if either (a) the sign of the previous cycle's diffused pixel value is negative or (b) the sign bit of the previous cycle's diffused pixel value is positive, the second and third most significant bits of the previous cycle's diffused pixel value are both zero and the previous cycle's binary pixel is a maximum binary print value.

12. The method of claim 11 wherein said minimum and maximum binary print values are zero and the maximum n-bit number, respectively, whereby the corresponding pixel error equals (a) the diffused pixel value if the corresponding binary pixel is the minimum print value and (b) the diffused pixel value plus the two's complement of the maximum n-bit number if the corresponding binary pixel is the maximum print value.

13. The method of claim 12 wherein the step of producing said diffused pixel value further comprises:
adding said sign bit of said previous pixel error to the least significant bit of said previous pixel error.

14. The method of claim 8 wherein each of said binary pixels is determined from the sign bit of the sum of the two's complement of said corresponding print decision threshold and the diffused pixel value.

15. An error diffusion processor apparatus for converting a continuous tone image consisting of an array of n-bit pixels to a binary image consisting of an array of binary print values corresponding to said n-bit pixels, said processor apparatus performing plural repetitive computational cycles, said processor apparatus processing each n-bit pixel in a respective computational cycle to produce a corresponding diffused pixel value and a corresponding one of said binary print values whereby said processor apparatus processes a current n-bit pixel in a current cycle, said processor apparatus comprising:

means for computing a partial sum of errors consisting of differences between: (a) a set of diffused pixel values computed from n-bit pixels in preceding cycles not including a previous cycle and (b) corresponding binary print values of said binary image determined in said preceding cycles;

means for computing a partial pixel value comprising means for adding said partial sum to said current n-bit pixel;

means for determining a sign of a pixel error of the previous cycle from a most significant bit of the diffused pixel value computed in said previous cycle and the binary print value determined in said previous cycle;

means for producing said pixel error of the previous cycle comprising means for appending said sign bit to the n least significant bits of the diffused pixel value computed in the previous cycle;

means for producing the diffused pixel value of the current cycle comprising means for adding said pixel error of the previous cycle to said partial pixel value; and means for determining said binary pixel value of the current cycle by adding said diffused pixel value of said current cycle to the two's complement of a corresponding print decision threshold to produce a decision sign bit.

16. The processor apparatus of claim 15 wherein said corresponding print decision threshold is comprised in an array of ordered dither print decision thresholds.

17. The processor apparatus of claim 15 further comprising:

means for storing said diffused pixel value for use during a next cycle; and means for storing said pixel error of the previous cycle for use during subsequent cycles, whereby said partial sum of errors is computed from the previous pixel errors stored in preceding cycles.

18. The processor apparatus of claim 15 wherein said partial sum of errors is-comprised in a weighted sum of errors whose coefficients are normalized to unity, and wherein said means for producing said pixel error of the previous cycle further comprises:

means for multiplying said pixel error of the previous cycle by a corresponding coefficient to said weighted sum.

19. The processor apparatus of claim 15 wherein the most significant bit of said diffused pixel value is a sign bit and wherein said means for determining said sign bit of the pixel error of the previous cycle comprises:

means for determining a positive sign bit whenever (a) the most significant bit of the previous cycle's diffused pixel value is positive and either (b) at least one of the second or third most significant bits of the previous cycle's diffused pixel value is one or (c) the previous cycle's binary print value is a minimum binary print value; and means for determining a negative sign bit whenever either (a) the sign of the previous cycle's diffused pixel value is negative or (b) the sign bit of the previous cycle's diffused pixel value is positive, a second and third most significant bits of the previous cycle's diffused pixel value are both zero and the previous cycle's binary print value is a maximum binary print value.

20. The processor apparatus of claim 19 wherein said minimum and maximum binary print values are zero and the maximum n-bit number, respectively, whereby the corresponding pixel error equals (a) the diffused pixel value if the corresponding binary print value is the minimum print value and (b) the diffused pixel value plus the two's complement of a maximum n-bit number if the corresponding binary print value is the maximum print value.

21. The processor apparatus of claim 20 wherein said means for producing said diffused pixel value further comprises:

carry means for adding said sign bit of said pixel error of the previous cycle to the least significant bit thereof.

22. Digital image processing apparatus for performing error diffusion to produce binary output pixel values from continuous tone n-bit input pixel values, comprising:

means for storing previous pixel errors;

means connected to the storing means for forming a first sum of previous errors excluding a previous pixel error;

means for forming a second sum of a present input pixel value and the first sum of the previous errors;

means responsive to the second sum and a previous pixel error for producing n-least significant bits of a present pixel error;

latch means for holding the n-least significant bit of a present pixel error to be produced as the n-least significant bits of a subsequent previous pixel error during a subsequent computation cycle;

means responsive to the second sum, a previous pixel error, and a previous output pixel for producing a sign bit of a subsequent previous pixel error;

means responsive to the n-least significant bits of the subsequent previous pixel errors and the sign of the subsequent previous pixel error to produce a subsequent previous pixel error; and means responsive to the second sum, the previous pixel error and a two's complement of a threshold value for producing a binary output value.

23. The digital image processing apparatus claimed in claim 22, further including means for storing the two's compliment of a plurality of threshold values and means for periodically selecting each of said plurality of threshold values for performing dither error diffusion.

* * * * *